US007295570B1

(12) United States Patent
Arnold et al.

(10) Patent No.: US 7,295,570 B1
(45) Date of Patent: *Nov. 13, 2007

(54) DETERMINING A PROFILE FOR AN INTERFACE OF A NETWORK DEVICE

(75) Inventors: Brian A. Arnold, Santa Rosa, CA (US); Kaartik Viswanath, Santa Clara, CA (US); Jeffrey Lee, Camarillo, CA (US); Pritesh N. Patel, Fremont, CA (US); Bruce B. Weller, San Jose, CA (US); Floyd H. Gerhardt, Woodside, CA (US)

(73) Assignee: Cisco Technology, Inc., San Jose, CA (US)

( * ) Notice: Subject to any disclaimer, the term of this patent is extended or adjusted under 35 U.S.C. 154(b) by 956 days.

This patent is subject to a terminal disclaimer.

(21) Appl. No.: 10/383,848

(22) Filed: Mar. 7, 2003

(51) Int. Cl.
*H04J 3/16* (2006.01)
(52) U.S. Cl. ................... 370/437; 370/395.2; 370/465; 370/468; 375/222; 375/232; 379/93.06; 379/93.31
(58) Field of Classification Search ..................... None
See application file for complete search history.

(56) References Cited

U.S. PATENT DOCUMENTS

| | | | | |
|---|---|---|---|---|
| 5,408,614 A | * | 4/1995 | Thornton et al. | 710/21 |
| 5,649,001 A | * | 7/1997 | Thomas et al. | 379/93.07 |
| 5,737,364 A | * | 4/1998 | Cohen et al. | 375/220 |
| 5,751,701 A | * | 5/1998 | Langberg et al. | 370/281 |
| 5,999,540 A | | 12/1999 | McGhee | 370/465 |
| 6,101,242 A | * | 8/2000 | McAllister et al. | 379/88.02 |
| 6,289,062 B1 | * | 9/2001 | Wang et al. | 375/346 |
| 6,389,065 B1 | | 5/2002 | McGhee | 375/222 |
| 6,553,075 B1 | | 4/2003 | McGhee et al. | 375/254 |
| 6,760,308 B1 | * | 7/2004 | Ghanma et al. | 370/235 |
| 7,075,975 B2 | * | 7/2006 | Lai et al. | 375/219 |
| 2002/0075298 A1 | * | 6/2002 | Schena et al. | 345/738 |
| 2004/0100974 A1 | * | 5/2004 | Kreiner et al. | 370/401 |
| 2004/0100975 A1 | * | 5/2004 | Kreiner et al. | 370/401 |
| 2004/0131016 A1 | * | 7/2004 | Hundal et al. | 370/252 |

OTHER PUBLICATIONS

*Transmission and Multiplexing (TM); Access transmission systems on metallic access cables; Very high speed Digital Subscriber Line (VDSL); Part 2: Transceiver specification*, ETSI, TS 101 270-2 V2.0.1 (Jul. 2002) Technical Specification; Secion 7.4.4, 3 pages.

(Continued)

*Primary Examiner*—Chirang G. Shah
(74) *Attorney, Agent, or Firm*—Baker Botts L.L.P.

(57) ABSTRACT

Selecting a profile for an interface of a network device includes accessing profile sequences, where each profile sequence corresponds to an interface. Each profile sequence includes profiles that provide parameters for communicating data. The following are repeated for a profile sequence for an interface until a link satisfies a sequence criterion or until a last profile of the profile sequence is reached to select a profile for the interface. A current profile is accessed, and a link for the interface is initiated according to the current profile. Whether the link for the interface satisfies the sequence criterion is determined. A next profile of the profile sequence is accessed if the link does not satisfy the sequence criterion, and the current profile is selected if the link satisfies the sequence criterion. Data is communicated according to the selected profile.

20 Claims, 3 Drawing Sheets

OTHER PUBLICATIONS

*Trial Use Standard,* T1.424/Trial-Use, Draft American National Standard for Telecommunications—Interface Between Networks and Customer Installations—Very-high Speed Digital Subscriber Lines (VDSL) Metallic Interface, Standards Committee T1 Telecommunications, Prepared by T1E1.4 Working Group on DSL Access, Alliance for Telecommunications Industry Solutions, Section 10.7.4, 3 pages, 2002.

Single-Carrier Rate Adaptive Digital Subscriber Line (RADSL), Technical Report No. 59, Sep. 1999, Committee T1—Telecommunicaitons, Prepared by T1E1.4, Working Group on Digital Subscriber Line (DSL) Access, Alliance for Telecommunications Industry Solutions, Section 1.2, Section 5.2.3, and Section 5.4.2, 23 total pages.

Co-Pending U.S. Appl. No. 09/608,202 entitled Dynamic Modulation Of Modulation Profiles For Communication Channels In An Access Network by Harihara Mahesh, et al., 43 total pages, Jun. 30, 2000.

Co-Pending U.S. Appl. No. 10/093,863 entitled Method And Apparatus For Optimizing Data Connection Performance by Peter Van Horne, 38 total pages, Mar. 7, 2002.

Co-Pending Application, entitled Selecting A Profile For An Interface Of A Network Device According To A Margin, by Brian A. Arnold, et al., 43 total pages, Mar. 7, 2003.

* cited by examiner

DETERMINING A PROFILE FOR AN INTERFACE OF A NETWORK DEVICE

TECHNICAL FIELD OF THE INVENTION

This invention relates generally to the field of telecommunications and more specifically to determining a profile for an interface of a network device.

BACKGROUND OF THE INVENTION

Digital subscriber line (DSL) technologies such as very-high-data-rate digital subscriber line (VDSL) technologies involve selection of profiles for communicating data between customer premises equipment and a network device. The selection may depend on, for example, the spectral environment available to the network device and the specific application for which the equipment is used. Accordingly, selecting communication profiles may require skilled personnel to configure the equipment to operate using selected profiles, assess the quality of the link acquired at the selected profiles, and reconfigure the equipment to operate using different profiles if the quality of the link is unsatisfactory. Consequently, known techniques for selecting profiles for communicating data between customer premises equipment and a network device may be unsatisfactory in certain situations.

SUMMARY OF THE INVENTION

In accordance with the present invention, disadvantages and problems associated with previous techniques for selecting communication profiles may be reduced or eliminated.

According to one embodiment of the invention, selecting a profile for an interface of a network device includes accessing profile sequences, where each profile sequence corresponds to an interface. Each profile sequence includes profiles that provide parameters for communicating data. The following are repeated for a profile sequence for an interface until a satisfies a sequence criterion or until a last profile of the profile sequence is reached to select a profile for the interface. A current profile is accessed, and a link for the interface is initiated according to the current profile. Whether the link for the interface satisfies the sequence criterion is determined. A next profile of the profile sequence is accessed if the link does not satisfy the sequence criterion, and the current profile is selected if the link satisfies the sequence criterion. Data is communicated according to the selected profile.

Certain embodiments of the invention may provide one or more technical advantages. A technical advantage of one embodiment may be that a network device uses a profile sequence to establish a link between an interface of the network device and customer premises equipment. The profile sequence comprises an ordered list of profiles, each of which may designate one or more rates at which data is to be communicated between the customer premises equipment and the network device. The network device attempts to establish a satisfactory link according to the ordered list of profiles to select a profile for communicating data.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which:

FIG. 4 is a flowchart illustrating one embodiment of a method for selecting a profile for an interface of a

DETAILED DESCRIPTION OF THE DRAWINGS

Embodiments of the present invention and its advantages are best understood by referring to FIGS. 1 through 4 of the drawings, like numerals being used for like and corresponding parts of the various drawings.

Figure 1:
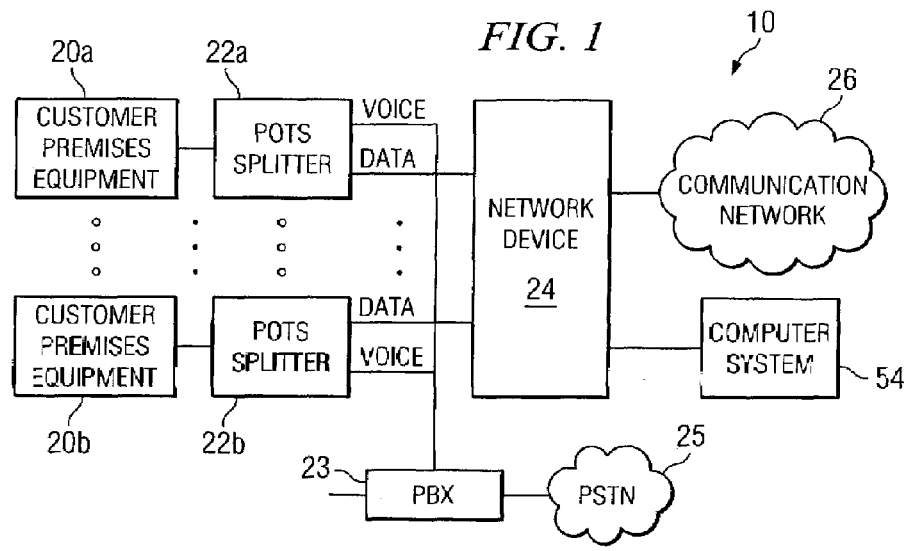
FIG. 1 is a block diagram illustrating one embodiment of a system that includes a network device that selects profiles for interfaces of the network device.

FIG. 1 is a block diagram illustrating one embodiment of a system 10 that includes a network device that selects profiles for the interfaces of the network device. The profiles provide parameters according to which network device communicates data to and from customer premises equipment. The network device determines profiles for each interface of the network device. "Each" as used in this document refers to each member of a set or each member of a subset of the set.

According to the illustrated embodiment, system 10 includes customer premises equipment 20*a-b*, plain old telephone service (POTS) splitters 22*a-b*, a private branch exchange (PBX) 23, a public switched telephone network (PSTN) 25, a network device 24, a communication network 26, and a computer system 54 coupled as illustrated in FIG. 1. Customer premises equipment 20*a-b* comprises communication equipment that resides at the end user's premises that is suitable for communicating with network device 24, which is typically not at the end user's premises. Customer premises equipment 20*a-b* typically resides at a customer's premises but could reside anywhere.

Communication equipment may include, for example, a voice device, a data device, or any combination of the preceding. A voice device may include, for example, a telephone, a fax machine, or any other equipment suitable for connecting to PBX 23, PSTN 25, or customer premises equipment 20*a-b*. A data device may include, for example, a computer, an IP telephone, or any other data device suitable for connecting to switch 24, computer system 54, or communications network 26. Premises may comprise, for example, an office, a factory, a residence, or any other location where communication equipment may be located.

Customer premises equipment 20*a-b* combines signals received from devices such as a voice device and a data device, and communicates the combined signal to POTS splitter 22*a-b* and switch 24. The signals may be distributed according to frequency. For example, the voice signal may have a frequency of approximately 0.3 kilohertz to 4 kilohertz, and the data signal may have a frequency of approximately 25 kilohertz to 12 megahertz. POTS splitter 22*a-b* splits signals received from customer premises equipment 22*a-b* into a voice signal and a data signal. Voice signals are communicated to PBX 23, and data signals are communicated to switch 24. PBX 23 communicates voice signals between POTS splitters 22*a-b* and PSTN 25.

Network device 24 communicates data from customer premises equipment 20*a-b* to communications network 26, and communicates data from communications network 26 to the appropriate customer premises equipment 20*a-b*. Network device 24 includes interfaces that are used to communicate with customer premises equipment 20*a-b*. Examples of network device 24 include a switch, a router, or other device operable to communicate signals. Network device 24 includes interfaces that are used to communicate with customer premises equipment 20*a-b*. According to one embodiment, network device 24 operates according to a digital subscriber link (DSL) technology such as a very-high-data-rate digital subscriber line (VDSL) technology. Network device 24 is described in more detail with reference to FIG. 2.

For each interface, network device 24 selects a profile sequence that includes profiles according to which the interface communicates with customer premises equipment 20*a-b*. Each profile may specify, for example, a rate set, which may include an upstream rate for communicating data from customer premises equipment 20*a-b* to network device 24 and a downstream rate for communicating data from network device 24 to customer premises equipment 20*a-b*. A method for selecting a profile is described in more detail with reference to FIG. 3. According to one embodiment, a profile may be associated with a margin comprising, for example, a measure of a link established according to the profile such as a signal-to-noise-ratio value or a Reed-Solomon error. A link may be designated as acceptable only if the link satisfies the margin. A method for selecting a profile according to a margin is described in more detail with reference to FIG. 4.

A rate set designates, among other things, a power spectral density for an interface. The power spectral density represents the amount of power that is applied to a range of the spectrum over a link in order to achieve a satisfactory level of signal strength at the receiving end of the link, and is typically measured in dBm per Hertz. A rate set also may include designations for bits per symbol, interpolation settings, interleaver or latency settings, and may include these per band used, and may include these for downstream communication, upstream communication, or both. The power spectral density according to which a link may be satisfactorily established is determined in part by the environment, which may be determined by, for example, type of cable, condition of cable, length of cable, existence of bridge taps, the presence of interferers such as near-end and far-end crosstalk, or any source of radiation emitted in the frequencies used by the system. Because the environment may include many factors, the appropriate power spectral density may be difficult to predict.

Computer system 54 may be used to provide commands to and receive reports from network device 24. Computer system 54 may include appropriate input devices, output devices, mass storage media, processors, computer system memory, or other components for receiving, processing, storing, and communicating information according to the operation of system 10. As used in this document, the term "computer" refers to any suitable device operable to accept input, process the input according to predefined rules, and produce output, for example, a personal computer, work station, network computer, wireless telephone, personal digital assistant, one or more microprocessors within these or other devices, or any other suitable processing device.

Communication network 26 allows customer premises equipment 20*a-b* to communicate with other networks or devices. Communication network 26 may comprise a public switched telephone network (PSTN), a public or private data network, the Internet, a wired or wireless network, a local, regional, or global communication network, an enterprise internet, other suitable communication link, or any combination of the preceding.

Modifications, additions, or omissions may be made to system 10 without departing from the scope of the invention. For example, although system 10 is illustrated as having two pieces of customer premises equipment 20*a-b*, system 10 may include any suitable number of pieces of customer premises equipment 20*a-b*. As another example, POTS splitter 22*a-b* may be included at customer premises equipment 20*a-b* or at network device 24, or may be omitted. Additionally, functions may be performed using any suitable logic comprising software, hardware, other logic, or any suitable combination of the preceding.

Figure 2:
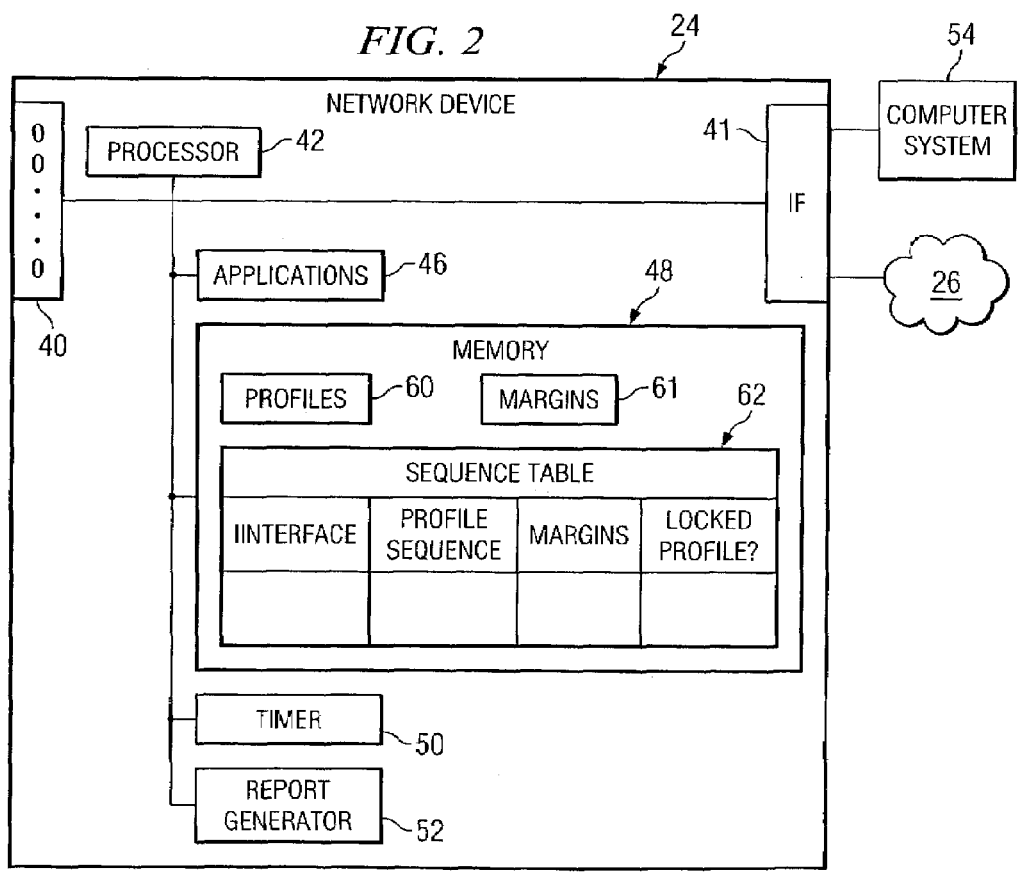
FIG. 2 is a block diagram illustrating one embodiment of the network device of FIG. 1.

FIG. 2 is a block diagram illustrating one embodiment of network device 24 of system 10. Network device 24 uses a profile sequence in order to select profiles at which network device 24 communicates with customer premises equipment 20*a-b*. According to one embodiment, network device 24 operates according to a digital subscriber link (DSL) technology such as a very-high-data-rate digital subscriber line (VDSL) technology.

According to the illustrated embodiment, network device 24 includes interfaces 40 and 41, a processor 42, applications 46, a memory 48, a timer 50, and a report generator 52 coupled as illustrated in FIG. 2. Interfaces 40 communicate data to and from customer premises equipment 20*a-b*. An interface 40 may comprise any suitable link for coupling network device 24 to customer premises equipment 20*a-b* such as a port. According to one embodiment, one interface may communicate with one customer premises equipment 20. Interfaces 40, however, may be configured with customer premises equipment 20*a-b* according to any suitable arrangement.

Processor 42 manages the operations of network device 24. Processor 42 comprises any suitable device operable to accept input, process the input according to predefined rules, and produce an output. Applications 46 provide instructions for processor 42. Interface 41 communicates data between network device 24 and communications network 26 and between network device 24 and computer system 54.

Memory 48 includes profiles 60, margins 61, and a sequence table 62. Profiles 60 specify how network device 24 communicates with customer premises equipment 20*a-b*, for example, how upstream and downstream data are communicated.

For example, profiles 60 may specify one or more downstream bands, one or more upstream bands, an interleaver depth, a transmit power, notch filter frequencies, or a preamble pattern. Each of the upstream bands and downstream bands may include one or more bands assigned to a specific direction. Each band may be defined as having attributes such as a carrier frequency, constellation (designated in bits per symbol), analog bandwidth, interleaver depth (which may also specify the latency of the data passed in this band), maximum transmit power, minimum transmit power, notch filter (which may include zero or more frequencies for which the transmit power is attenuated), transmit preamble pattern, or receive preamble pattern template. The analog bandwidth, in conjunction with the carrier frequency, may determine the lowest frequency and highest frequency used by the band. The constellation and analog bandwidth together may determine the data rate for the band.

Profiles 60 may specify these and other characteristics for the upstream channel, the downstream channel, or both.

Profiles 60 may also specify any number of other or additional parameters specific to the transport technology being employed.

According to one embodiment, each profile 60 may comprise a rate set that designates rates for communicating data. For example, a rate set may comprise an upstream rate specifying a rate for upstream communication and a downstream rate specifying a rate for downstream communication.

A profile 60 may also designate, for example, a center frequency and a bandwidth range of frequencies about the center frequency with which data is to be communicated. For example, according to an embodiment using two band VDSL, the frequency of the downstream band is lower than the frequency of the upstream band. A profile 60 may specify that the downstream band communicates with a center frequency of approximately 1.831 megahertz with a 1.3 megahertz bandwidth, and that the upstream band communicates with a center frequency of approximately 4.467 megahertz with a 970 kilohertz bandwidth.

TABLE 1 illustrates example profiles 60 that specify example downstream rates and upstream rates.

TABLE 1

| Profile Name | Downstream Rate (Mbps) | Upstream Rate (Mbps) |
|---|---|---|
| LRE-15 | 16.667 | 18.750 |
| LRE-15-5 | 16.667 | 6.250 |
| LRE-15-3 | 16.667 | 3.125 |
| LRE-15-1 | 16.667 | 1.563 |
| LRE-10 | 12.500 | 12.500 |
| LRE-10-5 | 12.500 | 6.250 |
| LRE-10-3 | 12.500 | 3.125 |
| LRE-10-1 | 12.500 | 1.563 |
| LRE-8 | 9.375 | 9.375 |
| LRE-7 | 8.333 | 8.333 |
| LRE-5 | 6.250 | 6.250 |
| LRE-4 | 4.167 | 4.167 |
| LRE-4-1 | 4.167 | 1.563 |
| LRE-3 | 3.125 | 3.125 |
| LRE-2 | 2.083 | 2.083 |

Each profile 60 of TABLE 1 includes an upstream rate and a downstream rate. For example, profile LRE-15 includes an upstream rate of 16.667 megabits per second and a downstream rate of 18.750 megabits per second.

Profiles 60 may be ordered to form a profile sequence by choosing the profiles from an ordered list. For example, a profile sequence may comprise an ordered sequence of LRE-15, LRE-10, LRE-8, and LRE-4. A profile sequence designates the order of profiles at which network device 24 attempts to establish a link at an interface 60. The order may be system defined or user defined. A sequence criterion associated with a profile sequence specifies whether a link is satisfactory such that a next profile of the profile sequence does not need to be selected to attempt a next link. For example, a link may be satisfactory if it is established.

The profiles 60 of a profile sequence may be chosen according to any suitable selection procedure to yield any suitable order that allows network device 24 to determine a profile 60 for an interface. For example, the profiles 60 may be selected according to a top-down selection procedure such that network device 24 first attempts to establish a link at the fastest rate. If the link cannot be established, the link may be designated as not satisfactory, so network device 24 attempts to establish a link at the next faster rate, and so on, until a link is established. As another example, the profiles 60 may be selected according to a bottom-up selection procedure such that network device 24 first attempts to establish a link at the slowest rate. If the link is established but too slow, the link may be designated as not satisfactory. Network device 24 may attempt to establish a link at the next slowest rate, and so on, until a link cannot be established to determine the fastest rate at which the link may be established.

As yet another example, the profiles 60 may be selected according to a binary selection procedure of the rates 60. The first profile may comprise a median rate set that divides the profiles into a set of faster profiles with faster rate sets and a set of slower profiles with slower rate sets. If the link is established, the next profile is the profile with the median rate set of the faster profiles. If the link is not established, the next profile is the profile with the median rate set of the slower profiles.

A faster rate may refer to a faster upstream rate, a faster downstream rate, a faster symmetric rate, or a faster aggregate rate comprising the sum of the upstream rate and the downstream rate. A slower rate may refer to a slower upstream rate, a slower downstream rate, a slower symmetric rate, or a slower aggregate rate comprising the sum of the upstream rate and the downstream rate.

Other criteria for selection may include threshold criteria, latency-based criteria, interleaver-depth-based criteria, bandplan-based criteria, constellation-based criteria, analog bandwidth-based criteria, notch-filter-based criteria, other suitable criteria, or any combination of the preceding.

Threshold criteria may include, for example, a downstream ceiling, upstream ceiling, downstream floor, or upstream floor. Latency-based criteria may include, for example, lowest downstream latency, lowest upstream latency, downstream latency ceiling, upstream latency ceiling, downstream latency floor, or upstream latency floor. Interleaver-depth-based criteria may include, for example, deepest downstream interleaver, deepest upstream interleaver, downstream interleaver depth ceiling, upstream interleaver depth ceiling, downstream interleaver depth floor, or upstream interleaver depth floor.

Bandplan-based criteria involves ordering profiles based on the bandplans with which the profiles comply. Bandplan-based criteria may include, for example, Plan 998, Plan 997, Plan C, Plan China, or Plan User Defined. Constellation-based criteria may include, for example, lowest downstream constellation, highest downstream constellation, lowest upstream constellation, highest upstream constellation, lowest aggregate constellation upstream and downstream, or highest aggregate constellation upstream and downstream.

Analog bandwidth-based criteria may include, for example, lowest downstream bandwidth, lowest upstream bandwidth, highest downstream bandwidth, highest upstream bandwidth, lowest downstream low frequency, lowest upstream low frequency, highest downstream low frequency, highest upstream low frequency, lowest downstream high frequency, lowest upstream high frequency, highest downstream high frequency, highest upstream high frequency, lowest downstream carrier frequency, highest downstream carrier frequency, lowest upstream carrier frequency, or highest upstream carrier frequency. Notch-filter-based criteria may include, for example, notch at frequency X or notches at frequency X+Xn.

Multiple criteria may include, for example, burst-noise protection (a function of the rate and the interleaver depth/latency), rates (using primary and secondary ordering of rate preferences), any collection of profile ordering where preferences are combined (for example, highest downstream rate and meets bandplan 997, while having notches at frequency X and using lowest downstream constellation and the highest downstream analog bandwidth), or multiple criteria with variable weighting.

Margins 61 may be used to assess the acceptability of a link established at certain profiles. Margins 61 may comprise, for example, a signal-to-noise-ratio (SNR), quantity of Reed-Solomon errors per unit time, receive power, automatic gain control gain, or actual transmit power. The actual transmit power used to maintain a link with other acceptable properties may be defined as X dB below a maximum allowable transmit power and Y dB above a minimum allowable transmit power to allow for sufficient headroom to modulate transmit power for other purposes. According to one embodiment, a margin 61 comprises a signal-to-noise ratio margin that represents the range above a theoretical signal-to-noise ratio minimum that an actual signal-to-noise ratio of a link should satisfy in order to be designated as acceptable. For example, if the theoretical signal-to-noise ratio minimum is 25 decibels and if the margin is three decibels, then the established link should have an actual signal-to-noise ratio of at least 28 decibels to be designated as acceptable.

The signal-to-noise ratio margin may have any suitable value, for example, the margins may be in a range of zero to ten decibels. The selection of a margin 61 may depend on a required bit-error ratio or a noise level of the environment. A lower bit-error ratio typically requires a higher signal-to-noise ratio. A noisier environment typically requires a higher signal-to-noise ratio. For example, a margin of two decibels may be used for a low noise environment, a margin of four decibels may be used for a medium noise environment, and a margin of six decibels may be used for a high noise environment.

Margins 61 may be selected for each rate of a rate set. For example, an upstream margin may be associated with an upstream rate and a downstream margin may be associated with a downstream rate. According to one embodiment, both upstream and downstream margins must be satisfied. Other embodiments, however, may require that only the downstream margins or only the upstream margins need to be satisfied.

TABLE 2 illustrates examples of margins 61 comprising signal-to-noise ratios for downstream rates.

TABLE 2

| Profile Name | Downstream Rate | QAM | Theoretical Min SNR (dB) | Low Noise SNR (dB) | Medium Noise SNR (dB) | High Noise SNR (dB) |
|---|---|---|---|---|---|---|
| LRE-4-1 | 4.17 | 16 | 22 | 24 | 26 | 29 |
| LRE-5 | 6.25 | 8 | 19 | 21 | 23 | 26 |
| LRE-10 | 12.5 | 64 | 25 | 27 | 29 | 32 |
| LRE-15 | 16.667 | 256 | 31 | 33 | 35 | 39 |
| LRE-10-5 | 12.5 | 64 | 25 | 27 | 29 | 32 |
| LRE-10-3 | | | | | | |
| LRE-10-1 | | | | | | |
| Public-ANSI | 16.667 | 256 | 31 | 33 | 35 | 39 |
| Public-ETSI | 12.5 | 256 | 31 | 33 | 35 | 39 |
| LRE-2 | 2.08 | 4 | 13 | 15 | 17 | 20 |
| LRE-3 | 3.13 | 4 | 13 | 15 | 17 | 20 |
| LRE-4 | 4.17 | 4 | 13 | 15 | 17 | 20 |

Different signal-to-noise ratios of TABLE 2 are specified for different amounts of noise. For example, for profile LRE-5, the low noise signal-to-noise ratio is 21 decibels, the medium noise signal-to-noise ratio is 23 decibels, and the high noise signal-to-noise ratio is 26 decibels. A default profile may be set at, for example, LRE-4-1.

TABLE 3 illustrates examples of margins 61 comprising signal-to-noise ratios for upstream rates.

TABLE 3

| Profile Name | Upstream Rate | QAM | Theoretical Min SNR (dB) | Low Noise SNR (dB) | Medium Noise SNR (dB) | High Noise SNR (dB) |
|---|---|---|---|---|---|---|
| LRE-4-1 | 1.56 | 4 | 13 | 15 | 17 | 20 |
| LRE-5 | 6.25 | 4 | 13 | 15 | 17 | 20 |
| LRE-10 | 12.5 | 16 | 19 | 21 | 23 | 26 |
| LRE-15 | 18.75 | 64 | 25 | 27 | 30 | 34 |
| LRE-10-5 | 6.25 | 4 | 13 | 15 | 17 | 20 |
| LRE-10-3 | 3.125 | 16 | 19 | 21 | 23 | 26 |
| LRE-10-1 | 1.56 | 4 | 13 | 15 | 17 | 20 |
| Public-ANSI | 4.688 | 64 | 25 | 27 | 29 | 32 |
| Public-ETSI | 4.688 | 64 | 25 | 27 | 29 | 32 |
| LRE-2 | 2.08 | 4 | 13 | 15 | 17 | 20 |
| LRE-3 | 3.13 | 4 | 13 | 15 | 17 | 20 |
| LRE-4 | 4.17 | 4 | 13 | 15 | 17 | 20 |

As illustrated in TABLE 3, different signal-to-noise ratios are specified for different noise levels. For example, for profile LRE-5, the low noise signal-to-noise ratio is 15 decibels, the medium noise signal-to-noise ratio is 17 decibels, and the high noise signal-to-noise ratio is 20 decibels. A default profile may be set at, for example, LRE-4-1.

Sequence table 62 is used to assign a sequence profile and an associated margin 61 to an interface 40. According to one embodiment, a profile sequence is assigned to each interface 40. A profile sequence, however, may be assigned to a set of interfaces 40 or to all interfaces 40 of network device 24. Additionally, some interfaces 40 of network device 24 may not have assigned profile sequences. For such interfaces 40, network device 24 may establish links at an assigned or a default profile.

Sequence table 62 may also indicate whether an interface 40 has a locked profile. Network device 24 may select a profile 60 for an interface 40 and then lock the selected profile 60 for the interface 40. In the event that network device 24 may need to perform profile selection for other interfaces 40, network device may revert back to the locked profile instead of performing profile selection for the interface 40.

Network device 24 may select a profile for an interface 40 according to any of a number of different processes. As discussed above, the profile may be selected according to a profile sequence assigned to interface 40, to a set of interfaces 40 that include interface 40, or to a global set of interfaces 40 of network device 24. Alternatively, the profile may be set by a profile assigned to interface 40, to a set of interfaces 40 to which interface 40 belongs, or to the global set of interfaces 40 of network device 24. The processes may be prioritized. For example, a profile assigned to interface 40 may take precedence over a global profile, and a sequence assigned to interface 40 may take precedence over a global sequence.

Timer 50 may include a watchdog timer that measures the duration that it takes for network device 24 to establish a link according to a profile 60. The watchdog timer may be set to any suitable duration, for example, approximately 30 seconds. Timer 50 may also measure the convergence time, which represents the amount of time network device 24 takes to select an appropriate profile 60. A suitable convergence time may be, for example, approximately less than two minutes. If a profile 60 is not selected within a suitable convergence time, network device 24 may select a default profile for the interface 40. The convergence time may be decreased by decreasing the duration of the watchdog timer. The convergence time may also be decreased by decreasing the number of profiles 60 of a profile sequence Report generator 52 generates reports describing the profiles for each interface 40, and may output reports through computer system 54. A report may describe the configured profile of a link that has been established at interface 40, the running profile of a link that network device 24 is attempting to establish at interface 40, or the type of profile assigned to interface 40. The type of profile may comprise, for example, a global profile, which is a single profile that is applied to all interfaces 40, an interface profile, a global sequence, which is a single profile sequence that is applied to all interfaces 40, or an interface sequence.

Modifications, additions, or omissions may be made to network device 24 without departing from the scope of the invention. For example, margins 61 are discussed as comprising signal-to-noise ratios. Margins 61, however, may comprise any suitable measure of link quality. Additionally, functions may be performed using any suitable logic comprising software, hardware, other logic, or any suitable combination of the preceding.

Figure 3:
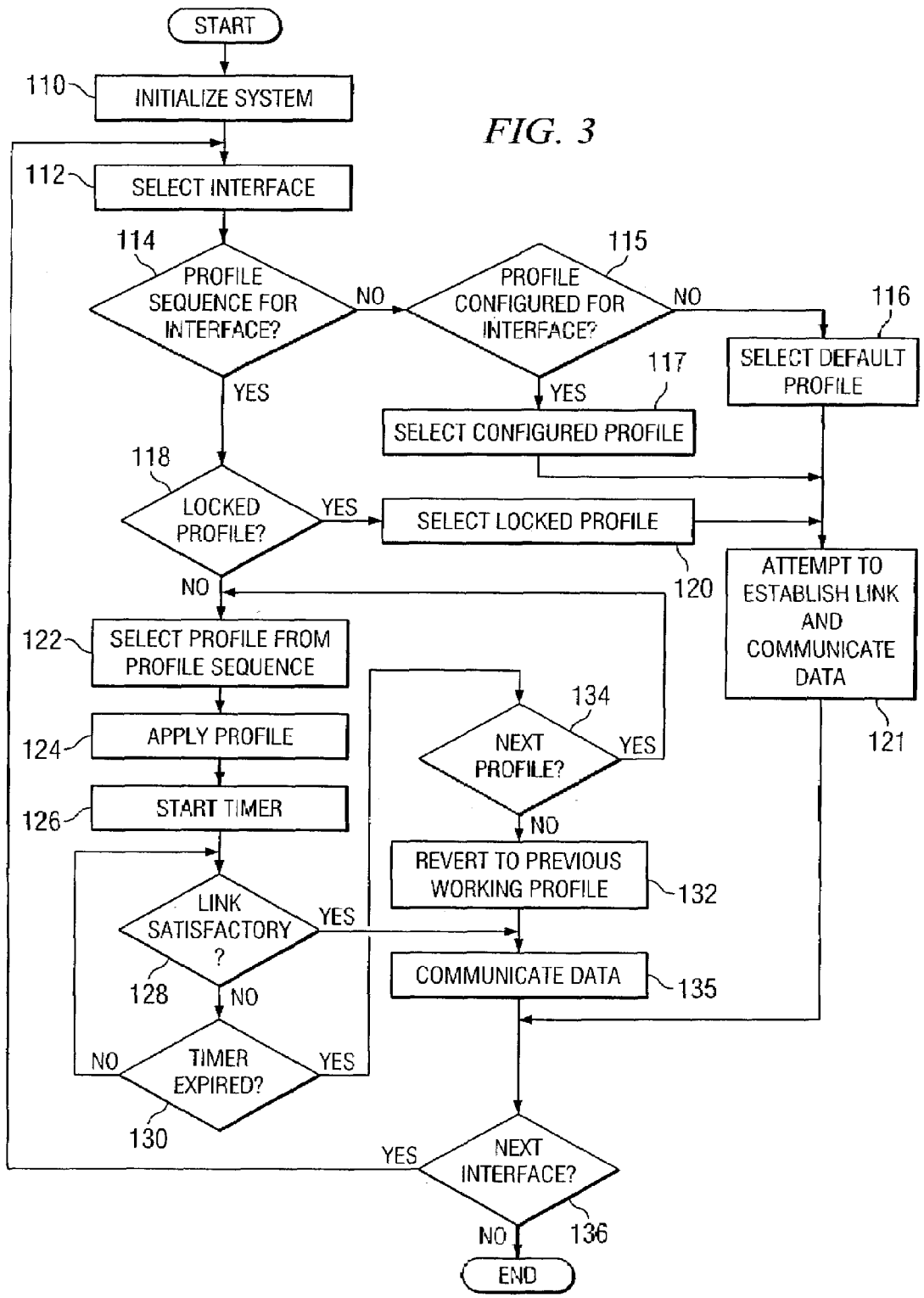
FIG. 3 is a flowchart illustrating one embodiment of a method for selecting a profile for an interface of a network device.

FIG. 3 is a flowchart illustrating one embodiment of a method for selecting a profile for an interface 40 of network device 24. The method may be executed at the occurrence of an event that signals that profiles are to be selected for interfaces 40. Events may include, for example, adding a new piece of customer premises equipment 20, losing a link for more than a specified period of time such as 25 seconds, determining that the health of a link falls below a threshold value, receiving an execution command to restart profile selection, or receiving a boot up command. Other events may include, for example, boot-up time, reset, time of link up, user demand time, loss of specified margin, or X occurrences of loss of margin occurring within time period Y. Alternatively, network device 24 may revert to a locked profile in place of executing the profile selection method. The method may also be automatically run periodically, such as once every day, week, or other time interval.

The method begins at 110, where system 10 is initialized. System initialization may include initialization of profile selection structures such as sequence table 62. The system configuration may also be processed as part of the system initialization. During initialization, a default profile may be applied to interfaces 40.

An interface 40 is selected at step 112. Network device 24 determines whether there is a profile sequence assigned to interface 40 by sequence table 62 at step 114. If there is no profile sequence assigned to interface 40, the method proceeds to step 115, where network device 24 determines whether a profile has been configured for interface 40. If a profile has been configured, the method proceeds to step 117, where the configured profile is selected. Network device 24 attempts to establish a link and communicate data according to the selected profile at step 121, and then proceeds to step 136. If a profile has not been configured, the method proceeds to step 116, where interface 40 selects the default profile, and the method proceeds to step 121.

If there is a profile sequence assigned to interface 40 at step 114, the method proceeds to step 118, where network device 24 determines whether interface 40 has a locked profile. If interface 40 has a locked profile, the method proceeds to step 120, where the locked profile is selected, and the method proceeds to step 121.

If interface 40 does not have a locked profile at step 118, the method proceeds to step 122, where a profile is selected from the profile sequence assigned to interface 40. The profile sequence includes an ordered sequence of profiles. At each iteration of the method, a profile is selected in accordance with the order. The selected profile is applied at step 124. The selected profile may include a rate set having an upstream rate and a downstream rate, and may be applied by initiating a link that communicates upstream data according to the upstream rate and that communicates downstream data according to the downstream rate.

Timer 50 is started at step 126. Network device 24 determines whether a link is satisfactory, for example, has been established at step 128. If the link has not been established, the method proceeds to step 130, where network device 24 determines whether timer 50 has expired. If timer 50 has not expired, the method returns to step 128, where network device 24 determines whether a link has been established. If timer 50 has expired, the method proceeds to step 134, where network device 24 determines whether there is a next profile of a profile sequence that is to be selected. If there is a next profile, the method returns to step 122 to select the next profile from the profile sequence. If there is no next profile, the method proceeds to step 132, where network device 24 reverts to the last profile that could be used to establish a link. The method then proceeds to step 135, where network device 24 communicates data across the established link. The method then proceeds to step 136. If a link has been established at step 128, the method proceeds directly to step 135.

At step 136, network device 24 determines whether there is a next interface 40 for which a profile may be selected. If there is a next interface 40, the method returns to step 112, where the next interface 40 is selected. If there is no next interface, the method terminates.

Modifications, additions, or omissions may be made to the method without departing from the scope of the invention. For example, network device 24 does not necessarily require the ability to lock a profile. Accordingly, determining whether there is a locked profile at step 118 does not need to be performed. Additionally, steps may be performed in any suitable order without departing from the scope of the invention. For example, starting timer 50 at step 126 may be performed prior to applying the profile at step 124.

Figure 4:
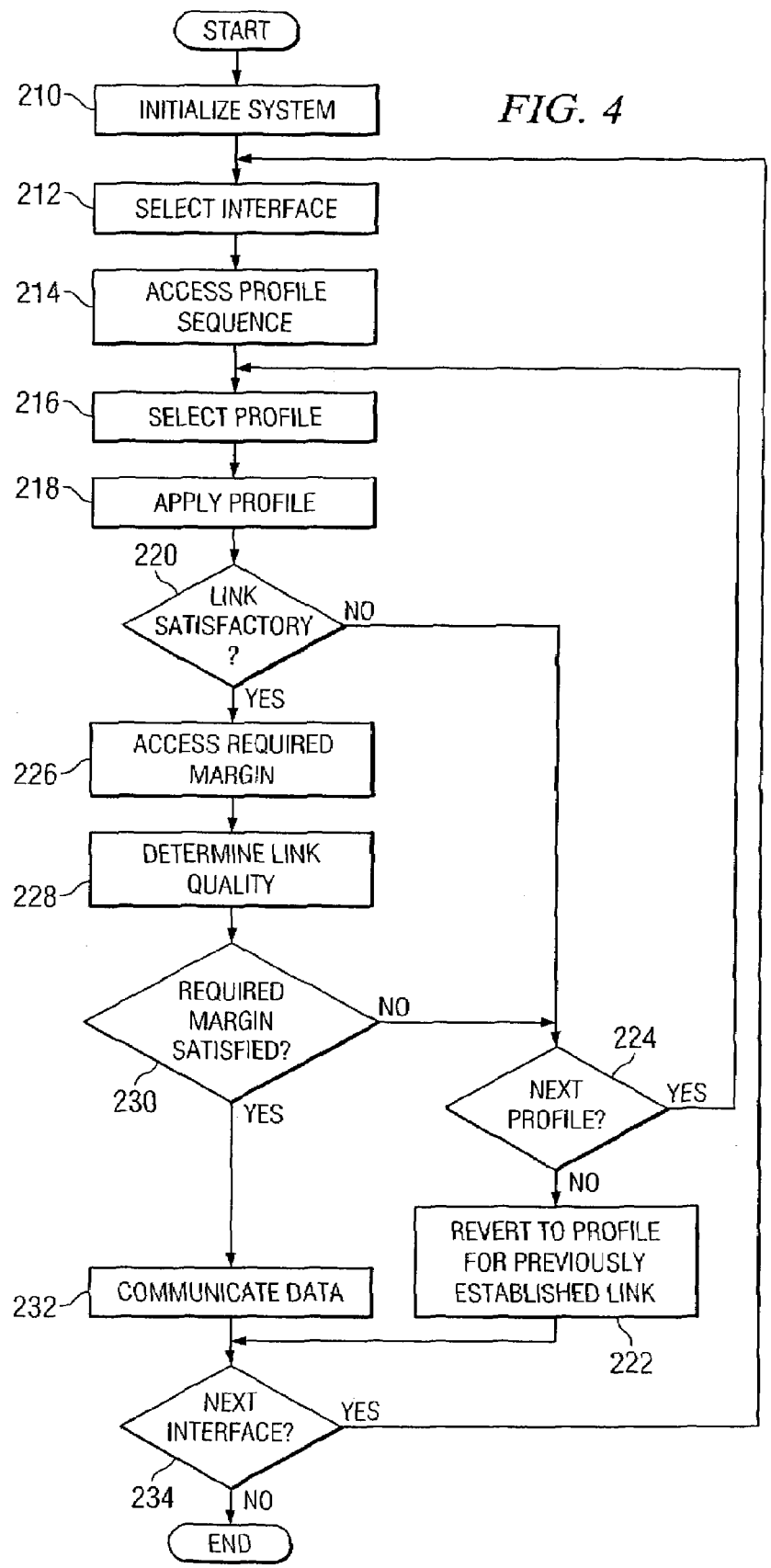

FIG. 4 is a flowchart illustrating one embodiment of a method for selecting a profile for an interface 40 of network device 24 according to a margin. The method begins at step 210, where system 10 is initialized. An interface 40 is selected at step 212. A profile sequence assigned to interface 40 by sequence table 62 is accessed at step 214. A profile is selected from the profile sequence at step 216.

The selected profile is applied at step 218 to initialize a link. Network device 24 determines whether a link is satisfactory, for example, has been established at step 220. If a link is not established, the method proceeds to step 224, where network device determines if there is a next profile of the profile sequence to be selected. If there is a next profile, the method returns to step 216 to select the next profile. If there is no next profile, the method proceeds to step 222, where system 24 reverts to a previous profile according to which a link was established, for example, a default profile. The method then proceeds to step 234. If a link is established at step 220, the method proceeds to step 226.

Network device 24 accesses a required margin associated with the profile from sequence table 62 at step 226. According to one embodiment, the margin may comprise a signal-to-noise ratio margin. The signal-to-noise ratio margin may be added to a theoretical signal-to-noise ratio to calculate a minimum signal-to-noise ratio that the link must satisfy. A link quality is determined at step 228. For example, the actual signal-to-noise ratio of the link may be measured.

Network device 24 determines whether the link satisfies the required margin at step 230. For example, the link satisfies the margin if the actual signal-to-noise ratio of the link measured at step 228 is greater than the minimum signal-to-noise ratio described at step 226. If the required margin is not satisfied, the method proceeds to step 224. If the required margin is satisfied, the method proceeds to step 232, where network device 24 communicates data according to the selected profile. The method then proceeds to step 234. At step 234, network device 24 determines if there is a next interface 40 for which a profile is to be selected. If there is a next interface 40, the method returns to step 212 to select the next interface 40. If there is no next interface 40, the method terminates.

Modifications, additions, or omissions may be made to the method without departing from the scope of the invention. Additionally, steps may be performed in any suitable order without departing from the scope of the invention.

Certain embodiments of the invention may provide one or more technical advantages. A technical advantage of one embodiment may be that a network device uses a profile sequence to establish a link between an interface of the network device and customer premises equipment. The profile sequence comprises an ordered list of profiles, each of which designates one or more profiles at which data is to be communicated between the customer premises equipment and the network device. The network device attempts to establish a satisfactory link according to the ordered list of profiles to select a profile for communicating data.

Although an embodiment of the invention and its advantages are described in detail, a person skilled in the art could make various alterations, additions, and omissions without departing from the spirit and scope of the present invention as defined by the appended claims.

What is claimed is:

1. A method for selecting a profile for an interface of a network device, comprising:
   accessing a plurality of profile sequences associated with a network device comprising a plurality of interfaces, each profile sequence corresponding to an interface of the plurality of interfaces, each profile sequence comprising a plurality of profiles, each profile providing at least one parameter for communicating data;
   repeating the following for one or more profiles of a profile sequence corresponding to an interface until a link is established for the interface or until a last profile of the profile sequence is reached in order to select a profile for the interface:
      accessing a current profile;
      initiating a link for the interface according to the current profile;
      determining if the link for the interface is established;
      accessing a next profile of the profile sequence if the link is not established; and
      selecting the current profile if the link is established; and
   communicating data according to the selected profile.

2. The method of claim 1, wherein a profile comprises a member selected from a group consisting of a downstream band, an upstream band, an interleaver depth, a transmit power, a notch filter frequency, and a preamble pattern.

3. The method of claim 1, further comprising:
   locking the current profile if the link is established; and
   selecting the locked current profile for the interface if the link is dropped to initiate a new link.

4. The method of claim 1, wherein accessing a next profile of the profile sequence if the link is not established comprises:
   accessing a list of the sequences; and
   choosing the next profile from the list of the sequences according to a selection criterion.

5. The method of claim 1, wherein accessing a next profile of the profile sequence if the link is not established comprises:
   accessing a list of the sequences; and
   choosing the next profile from the list of the sequences according to a selection criterion selected from a group consisting of a threshold criterion, a latency-based criterion, an interleaver-depth-based criterion, a band-plan-based criterion, a constellation-based criterion, an analog bandwidth-based criterion, and a notch-filter-based criterion.

6. The method of claim 1, further comprising communicating the data at a default profile if the link is not established at any profile of the profile sequence.

7. An apparatus for selecting a rate for an interface of a network device, comprising:
   a memory operable to store a plurality of profile sequences associated with a network device comprising a plurality of interfaces, each profile sequence corresponding to an interface of the plurality of interfaces, each profile sequence comprising a plurality of profiles, each profile providing at least one parameter for communicating data; and
   a processor coupled to the memory and operable to:
      repeat the following for one or more profiles of a profile sequence corresponding to an interface until a link is established for the interface or until a last profile of the profile sequence is reached in order to select a profile for the interface:
         access a current profile;
         initiate a link for the interface according to the current profile;
         determine if the link for the interface is established;
         access a next profile of the profile sequence if the link is not established; and
         select the current profile if the link is established; and
      communicate data according to the selected profile.

8. The apparatus of claim 7, wherein a profile comprises a member selected from a group consisting of a downstream band, an upstream band, an interleaver depth, a transmit power, a notch filter frequency, and a preamble pattern.

9. The apparatus of claim 7, wherein the processor is further operable to:
   lock the current profile if the link is established; and
   select the locked current profile for the interface if the link is dropped to initiate a new link.

10. The apparatus of claim 7, wherein the processor is operable to access a next profile of the profile sequence if the link is not established by:
   accessing a list of the sequences; and choosing the next profile from the list of the sequences according to a selection criterion.

11. The apparatus of claim 7, wherein the processor is operable to access a next profile of the profile sequence if the link is not established by:
accessing a list of the sequences; and
choosing the next profile from the list of the sequences according to a selection criterion selected from a group consisting of a threshold criterion, a latency-based criterion, an interleaver-depth-based criterion, a bandplan-based criterion, a constellation-based criterion, an analog bandwidth-based criterion, and a notch-filter-based criterion.

12. The apparatus of claim 7, wherein the processor is further operable to communicate the data at a default profile if the link is not established at any profile of the profile sequence.

13. A computer-readable medium having computer-executable instructions for selecting a rate for an interface of a network device, when executed by a computer operable to:
access a plurality of profile sequences associated with a network device comprising a plurality of interfaces, each profile sequence corresponding to an interface of the plurality of interfaces, each profile sequence comprising a plurality of profiles, each profile providing at least one parameter for communicating data;
repeat the following for one or more profiles of a profile sequence corresponding to an interface until a link is established for the interface or until a last profile of the profile sequence is reached in order to select a profile for the interface:
access a current profile;
initiate a link for the interface according to the current profile;
determine if the link for the interface is established;
access a next profile of the profile sequence if the link is not established; and
select the current profile if the link is established; and
communicate data according to the selected profile.

14. The computer-readable medium of claim 13, wherein a profile comprises a member selected from a group consisting of a downstream band, an upstream band, an interleaver depth, a transmit power, a notch filter frequency, and a preamble pattern.

15. The computer-readable medium of claim 13, further operable to:
lock the current profile if the link is established; and
select the locked current profile for the interface if the link is dropped to initiate a new link.

16. The computer-readable medium of claim 13, operable to access a next profile of the profile sequence if the link is not established by:
accessing a list of the sequences; and
choosing the next profile from the list of the sequences according to a selection criterion.

17. The computer-readable medium of claim 13, when executed by the computer further operable to access a next profile of the profile sequence if the link is not established by:
accessing a list of the sequences; and
choosing the next profile from the list of the sequences according to a selection criterion selected from a group consisting of a threshold criterion, a latency-based criterion, an interleaver-depth-based criterion, a bandplan-based criterion, a constellation-based criterion, an analog bandwidth-based criterion, and a notch-filter-based criterion.

18. The computer-readable medium of claim 13, when executed by the computer further operable to communicate the data at a default profile if the link is not established at any profile of the profile sequence.

19. A system for selecting a rate for an interface of a network device, comprising:
means for accessing a plurality of profile sequences associated with a network device comprising a plurality of interfaces, each profile sequence corresponding to an interface of the plurality of interfaces, each profile sequence comprising a plurality of profiles, each profile providing at least one parameter for communicating data;
means for repeating the following for one or more profiles of a profile sequence corresponding to an interface until a link is established for the interface or until a last profile of the profile sequence is reached in order to select a profile for the interface:
accessing a current profile;
initiating a link for the interface according to the current profile;
determining if the link for the interface is established;
accessing a next profile of the profile sequence if the link is not established; and
selecting the current profile if the link is established; and
means for communicating data according to the selected profile.

20. A method for selecting a profile for an interface of a network device, comprising:
accessing a plurality of profile sequences associated with a network device comprising a plurality of interfaces, each profile sequence corresponding to an interface of the plurality of interfaces, each profile sequence comprising a plurality of profiles, each profile providing at least one parameter for communicating data, a profile comprising a member selected from a group consisting of a downstream band, an upstream band, an interleaver depth, a transmit power, a notch filter frequency, and a preamble pattern;
repeating the following for one or more profiles of a profile sequence corresponding to an interface until a link is established for the interface or until a last profile of the profile sequence is reached in order to select a profile for the interface:
accessing a current profile, initiating a link for the interface according to the current profile, and determining if the link for the interface is established;
accessing a next profile of the profile sequence if the link is not established by accessing a list of the sequences, and by choosing the next profile from the list of the sequences according to a selection criterion selected from a group consisting of a threshold criterion, a latency-based criterion, an interleaver-depth-based criterion, a bandplan-based criterion, a constellation-based criterion, an analog bandwidth-based criterion, and a notch-filter-based criterion; and
selecting the current profile if the link is established; and
communicating data according to the selected profile;
communicating the data at a default profile if the link is not established at any profile of the profile sequence; and
locking the current profile if the link is established, and selecting the locked current profile for the interface if the link is dropped to initiate a new link.

* * * * *